United States Patent

Maron et al.

[11] Patent Number: 5,962,931
[45] Date of Patent: Oct. 5, 1999

[54] ELECTRIC BRAKE SYSTEM AND METHOD FOR OPERATING THE SAME

[75] Inventors: Christof Maron, Gehrden; Thomas Dieckmann, Pattensen, both of Germany

[73] Assignee: Continental Aktiengesellschaft, Hannover, Germany

[21] Appl. No.: 08/934,663

[22] Filed: Sep. 22, 1997

[30] Foreign Application Priority Data

Sep. 21, 1996 [DE] Germany ............................ 196 38 759

[51] Int. Cl.⁶ ..................................................... H01H 47/00
[52] U.S. Cl. ...................... 307/125; 307/116; 303/122.04
[58] Field of Search .................................... 307/125, 112, 307/116, 139, 103; 340/500, 517, 521, 635, 652; 361/67; 303/1, 122.04, 122.05, 122, 20; 701/70, 76

[56] References Cited

U.S. PATENT DOCUMENTS

| | | | |
|---|---|---|---|
| 4,804,234 | 2/1989 | Gee et al. ..................................... | 303/7 |
| 4,804,237 | 2/1989 | Gee et al. ..................................... | 303/7 |
| 4,835,695 | 5/1989 | Walenty et al. ................... | 364/426.02 |
| 4,984,852 | 1/1991 | McNinch, Jr. ............................. | 303/15 |
| 5,460,434 | 10/1995 | Micke et al. ............................ | 303/9.62 |
| 5,488,352 | 1/1996 | Jasper ....................................... | 340/431 |

FOREIGN PATENT DOCUMENTS

| | | |
|---|---|---|
| 4040405 | 7/1992 | Germany . |
| 4141586 | 6/1993 | Germany . |
| 195 37 464 | 4/1997 | Germany . |

*Primary Examiner*—Jeffrey Gaffin
*Assistant Examiner*—Peter Zura
*Attorney, Agent, or Firm*—Walter Ottesen

[57] ABSTRACT

The invention relates to an electric brake system for a motor vehicle and a method for operating the same. In conventional electric brake systems, the energy consumers (6, 8a, 10a, 14b, 16b, 30a, 30b) are connected to the voltage source (24a, 24b) when a switch-on signal is applied. This has the problem associated therewith that, when the switch-on signal is absent for any particular reason, the energy consumers (6, 8a, 10a, 14b, 16b, 30a, 30b) can be disconnected from the voltage source (24a, 24b) during operation of the motor vehicle. This problem is avoided in that the energy consumers (6, 8a, 10a, 14b, 16b, 30a, 30b) remain connected to the voltage source independently of the presence of the switch-on signal. A disconnection of the voltage source from the energy consumers (6, 8a, 10a, 14b, 16b, 30a, 30b) is only triggered by the computer unit (6, 30a, 30b) by driving an ignition-switch device 28.

11 Claims, 3 Drawing Sheets

ELECTRIC BRAKE SYSTEM AND METHOD FOR OPERATING THE SAME

FIELD OF THE INVENTION

The invention relates to an electric brake system for a motor vehicle which, inter alia, includes the following components: at least one energy consumer; at least one computer unit; at least one voltage source, which can be connected to the energy consumers; and, an ignition switching device, which connects the voltage source to the energy consumer when a switch-on signal is applied. The invention also relates to a method for operating such an electric brake system for a motor vehicle.

BACKGROUND OF THE INVENTION

Electric brake systems of the above-mentioned kind are already known and are referred to also as brake-by-wire brake systems. The electric brake system includes several electric energy consumers such as at least one computer unit and a brake actuator for each wheel of the motor vehicle. By applying a switch-on signal, the energy consumers are connected to a voltage source so that the electric brake system is operational and is ready for braking operations. If a braking command is issued by a driver of the motor vehicle by applying foot force on a brake pedal, then the effect of the foot force on the pedal is detected by a sensor and is converted into an electric signal. The signal is then transmitted to the brake actuators and each brake actuator exercises, inter alia, a brake force on the wheel of the motor vehicle assigned thereto with the aid of an electric motor.

Electric brake systems of this kind can be considered as reliable especially because they are configured in two loops as are the conventional brake systems and therefore a channel is provided for each electric signal in each brake loop. If one of the signals is absent or one of the channels fails and if a brake loop thereby becomes inoperative, then the other brake loop remains operational and the electric brake system is operational to a limited extent. It is, however, noted that the switch-on signal is a one-channel signal. Accordingly, if the switch-on signal is absent (for example, because of a connector becoming separated or because of a break in a cable, which transmits the switch-on signal), then a complete failure of the entire electric brake system can occur (that is, both electric brake loops) and the motor vehicle can no longer be braked. The failure of the electric brake system is especially critical when the motor vehicle is otherwise operational and in movement. In summary, the failure of the switch-on signal can lead to a situation wherein the safe operation of the vehicle is affected and this is unacceptable.

SUMMARY OF THE INVENTION

It is an object of the invention to provide an electric brake system wherein an impairment of the motor vehicle with respect to safety is avoided even when there is an absence of the switch-on signal. It is another object of the invention to provide a method for operating an electric brake system of this kind.

The electric brake system of the invention is for a motor vehicle wherein a switch-on signal is initiated. The electric brake system includes: at least one energy consumer; at least one computer unit; at least one voltage source; an ignition-switch device for connecting the voltage source to the energy consumer when the switch-on signal is applied to the device; the computer unit being connected to the ignition-switch device; and, the ignition-switch device including circuit means for maintaining a connection between the energy consumer and the voltage source notwithstanding a drop in or a switch-off of the switch-on signal until the computer operates on the circuit means to cause the energy consumer to be disconnected from the voltage source.

The method of the invention is for operating an electric brake system for a motor vehicle wherein a switch-on signal is initiated. The electric brake system includes: at least one energy consumer; at least one computer unit; at least one voltage source; an ignition-switch device for connecting the voltage source to the energy consumer when the switch-on signal is applied to the device. The method includes the step of: keeping the energy consumer connected to the voltage source until the computer unit triggers the disconnection of the energy consumer from the voltage source.

In the following, the switch-on signal is understood to be the ignition signal in the simplest case. The ignition signal is generated by actuating the ignition key. However, the switch-on signal can also be a signal which is only generated when the ignition signal is applied and further conditions are satisfied. For example, an additional condition can be that there is an adequate charging state of the voltage source which supplies the energy consumers with electric energy.

The basic idea of the invention is that the energy consumers of the electric brake system are connected to a voltage source because of a switch-on signal and that the connection of the energy consumers to the voltage source is however maintained independently of the switch-on signal and a disconnection of the energy consumers from the voltage source can only be initiated by the computer unit of the electric brake system. Preferably, the disconnection is initiated by the computer unit when, with the input signal not present, it is determined that the vehicle is not in service.

The advantages achieved with the invention are especially that the complete operability of the electric brake system is maintained (independently of the application of the switch-on signal) until the disconnection of the energy consumers from the voltage source is initiated by the computer unit of the electric brake system. If for any reason, there is an absence of the switch-on signal, the operability of the electric brake system and therefore the safety of the motor vehicle is not impaired.

According to a further feature of the invention, the computer unit of the electric brake system is so configured that a disconnection of the energy consumers from the voltage source is only initiated by the computer unit when specific motor vehicle parameters (such as the wheel rpm, the crankshaft rpm, the switch-on signal, et cetera) satisfy predetermined conditions. The advantage of this feature of the invention is seen in that the situation of the motor vehicle can be reliably detected from the check of the motor vehicle parameters and the energy consumer is only disconnected from the voltage source by the computer unit when it is reliably determined that the motor vehicle is not in operation (the computer unit can, for example, reliably assume that the motor vehicle is not in operation when the wheels and the crankshaft of the motor vehicle are not rotating and when no switch-on signal is present).

According to a preferred embodiment of the invention, the check of the predetermined conditions of the motor vehicle parameters is made by the computer unit itself. For this purpose, the computer unit is supplied with various sensor signals with respect to the motor vehicle parameters. The advantage of this embodiment is that, when there is a failure of one of the sensors, the signals of the other sensors will still be available for a check of the vehicle situation.

According to a further embodiment of the invention, the computer unit triggers still other operations in the electric brake system after the switch-off of the switch-on signal and before disconnection of the energy consumer from the voltage source. Such other operations can, for example, be applying an electric parking brake or activating an electric drive-inhibit device. The advantage of this additional embodiment is seen in that the control of the electric brake system is under the complete management of the control unit. Further, it is especially advantageous in this embodiment when the additional control of the electric brake system is only initiated by the computer unit after the computer unit is first completely convinced of a standstill of the motor vehicle. In this case, it can, for example, be ensured that the electric parking brake is only applied when the motor vehicle is no longer in operation.

According to the first embodiment of the invention, the voltage source can be connected to the energy consumers via a supply path which is closed by the ignition-switch device when a switch-on signal is applied via a switch, which, after a switch-off of the switch-on signal, remains closed until the computer unit triggers the opening of the switch and therewith the supply path.

According to a second embodiment of the invention, the voltage source of the electric brake system can be connected via at least one other supply path to the energy consumers. In this case, all supply paths are closed by respective switches of the ignition-switch device when the switch-on signal is applied and at least one of the supply paths continues to remain closed after a switch-off of the switch-on signal until the computer unit triggers the opening of this supply path. The advantage of this embodiment is seen in that the reliability of the electric brake system is further increased. If, there is, for example, a failure of one of the switches so that this switch and therefore the corresponding supply path can no longer be closed, then the energy consumers still remain connected to the voltage source via the other switches and the second supply path. Notwithstanding the failure of a switch, the complete operability of the electric brake system is maintained.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
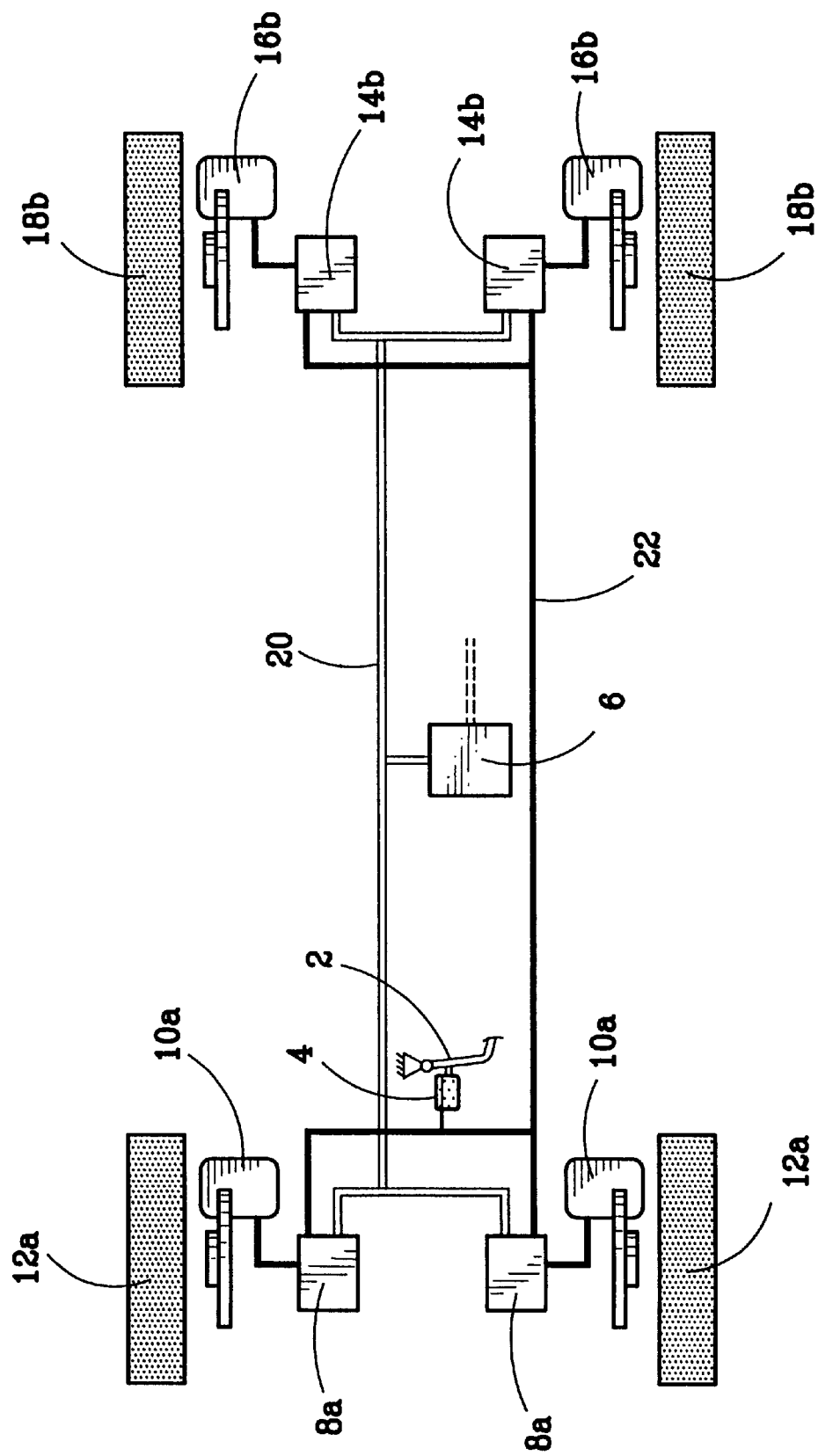
FIG. 1 is a schematic representation of the electric brake system according to the invention.

FIG. 1 is a schematic of a two-loop electric brake system for a motor vehicle. Only those components are shown which are necessary for explaining the invention. The reference numerals identifying the components of the first brake loop are each provided with the letter "a" and the reference numerals which identify the components of the second brake loop are each provided with the letter "b". A foot force, which corresponds to the braking command of the driver of the motor vehicle, is applied to brake pedal 2 which causes this brake pedal to be moved. The distance through which the brake pedal 2 is moved is converted into an electric signal by sensor 4 and this signal corresponds to the brake command of the driver. The electric signal is conducted via the signal line 22 to the computer units 8a of the first brake loop as well as to the computer units 14b of the second brake loop. There, control signals are generated from the electric brake signal and are conducted to the brake actuators 10a of the forward wheels 12a and to the brake actuators 16b of the rear wheels 18b. The brake actuators 10a and 16b are activated in correspondence to the control signals which causes a braking force to be generated at the forward wheels 14a and at the rearward wheels 18b. The computer units 8a and 14b can exchange data with the central computer unit 6 via the serial data bus 20.

Figure 2:
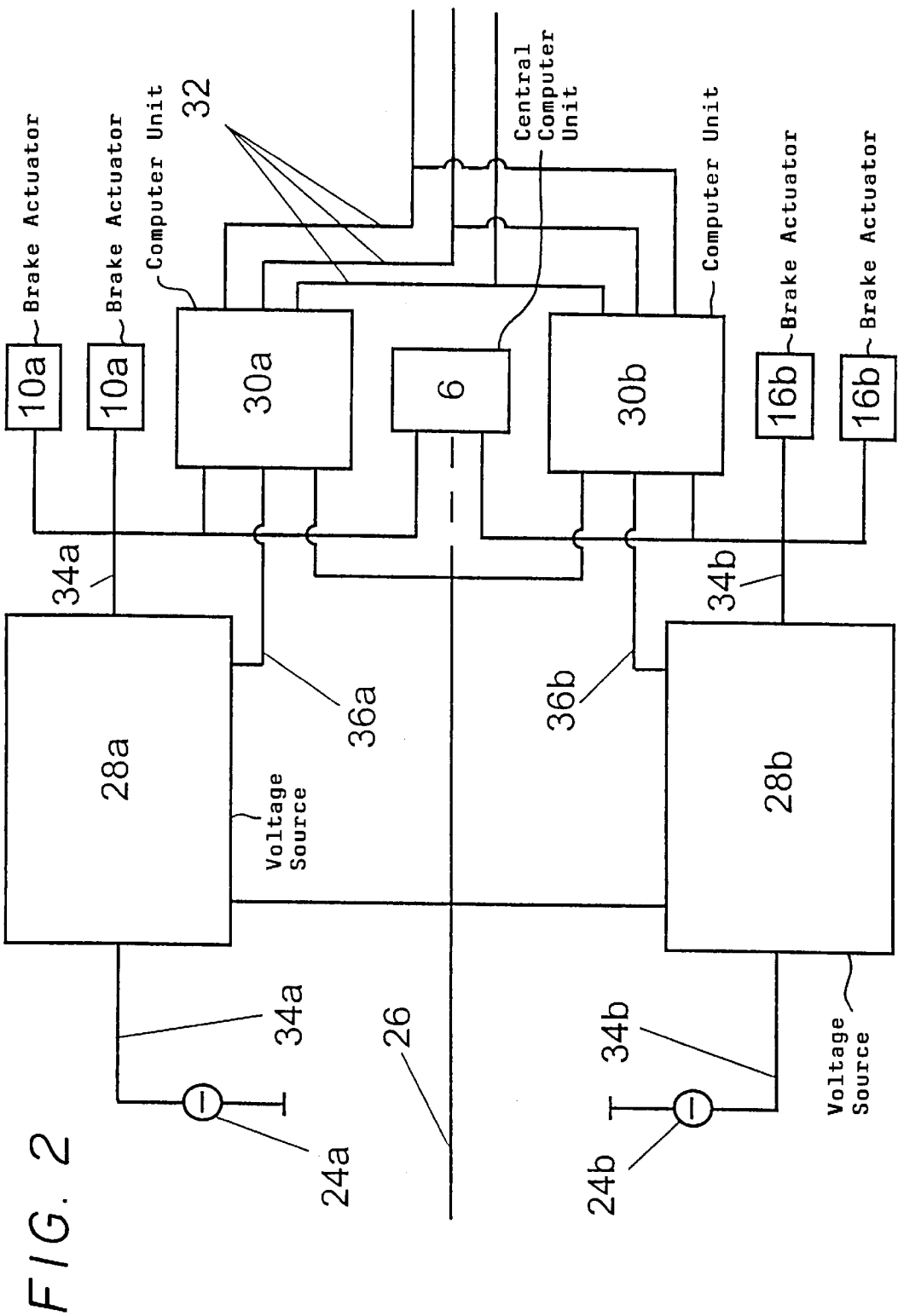
FIG. 2 is a block circuit diagram showing the voltage supply of the electric brake system.

FIG. 2 is a circuit block diagram showing the voltage supply of the electric brake system shown in FIG. 1. In FIG. 2 also, the reference numerals identifying the components of the first brake loop are provided with a letter "a" and the reference numerals identifying the components of the second brake loop are provided with the letter "b".

For each brake loop, the electric brake system includes a voltage source (24a or 24b), which supplies voltage via a supply path (34a or 34b) to the following: the brake actuators (10a or 16b), the computer units (30a or 30b) and the central computer unit 6. The computer unit 30a includes the computer units 8a and the computer unit 30b includes the computer units 14b. An ignition-switch device 28a is connected between the voltage source 24a and the above-mentioned energy consumers and an ignition-switch device 28b is connected between the voltage source 24b and the above-mentioned energy consumers.

In the following, the voltage supply of the electric brake system is explained with respect to FIG. 2.

When the motor vehicle is started, the switch-on signal is supplied to the signal line 26 and is conducted to the ignition-switch device (28a, 28b), to the computer units (30a, 30b) and, if required, to the central computer unit 6. Thereafter, the supply path (34a or 34b), which had been open up until now, is closed by the ignition-switch device (28a or 28b) so that the above-mentioned energy consumers are connected to the voltage source (24a or 24b) and therefore the electric brake system, that is, both braking loops are operational. The supply path (34a or 34b) remains closed until the opening thereof is effected by the computer units (30a or 30b) via the signal lines (36a or 36b). The supply path (34a or 34b) is also closed when the switch-on signal is absent and, for example, is no longer conducted to the ignition-switch device (28a or 28b).

An opening of the supply path (34a or 34b) is preferably only effected when no switch-on signal is applied to the computer unit (30a or 30b) and it is reliably determined that the motor vehicle is no longer in operation. To provide a reliable determination, specific motor vehicle parameters (such as the wheel rpms, the crankshaft rpm and the switch-on signal, et cetera) are continuously monitored by the control unit (30a or 30b). For this purpose, sensor signals are supplied via the corresponding signal lines 32 to the computer units (30a or 30b) so that the sensor signals are continuously available in the computer unit (30a or 30b). The computer unit (30a or 30b) can, for example, reliably assume that the motor vehicle is not in operation when the wheel rpm and the crankshaft rpm vanish and, furthermore, when no switch-on signal is present. In this case, the command to open the supply paths (34a or 34b) is given by the computer unit (30a or 30b) to the ignition-switch device (28a or 28b) via the signal line (36a or 36b).

Figure 3:
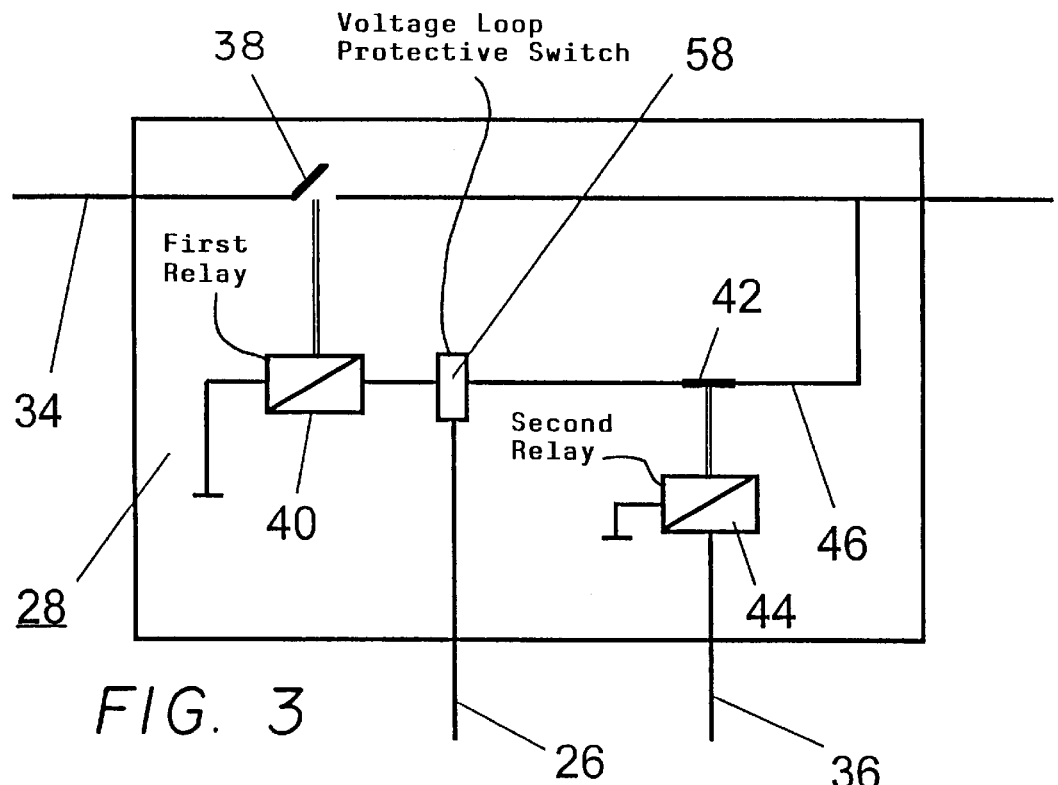
FIG. 3 is a circuit diagram of a first embodiment of an ignition-switch device; and, FIG. 4 is an electric circuit diagram of a second embodiment of an ignition-switch device.

FIG. 3 shows an embodiment for an ignition-switch device 28. The ignition-switch device 28 includes a first switch 38 which is closed when a switch-on signal is applied to the signal line 26. For this purpose, the ignition-switch device 28, for example, includes a first relay 40 having a coil through which current flows when a switch-on signal is applied to the signal line 26 so that the switch 38 is acted upon and closes the supply path 34. The ignition-switch device includes further an ancillary path 46 which connects the supply path 34 to the input of the first relay so that the input of the first relay is continuously supplied with voltage as long as the first switch 38 is closed. The signal line 26 and the ancillary path 46 are connected to a voltage loop protective switch 58 which reliably disconnects the two voltage loops via the signal line 26 or the ancillary path 46, so that a mutual impairment of the voltage loops is precluded. If there is a drop in the input signal or if the input signal is not present on the signal line 26, then the input of the first relay 40 is nonetheless supplied with voltage via the ancillary path 46 so that the first switch 38 continues to be in its "pulled-in state" and the supply path 34 remains closed notwithstanding the absence of the input signal (this means nothing other than that the voltage source remains connected to the energy consumers in the electric brake system).

The supply path 34 can only be opened when the ancillary path 46 is interrupted and the input of the first relay 40 is thereby no longer supplied with voltage. Opening a switch 42 is effected by the computer unit 30 in that a corresponding signal is given at the input of the second relay 44 via the signal line 36 so that current flows through the coil of the second relay 44 and, as a consequence thereof, the switch 42 is acted upon and the ancillary path 46 is opened. As a consequence of the opening of the ancillary path 46, the input of the first relay is no longer supplied with voltage so that the first relay 40 no longer acts on the switch 38 so that the switch 38 opens and therefore also opens the supply path 34.

If effecting the opening of the supply path 34 by the computer unit 30 is completed, then no signal is therefore applied to the signal line 36 so that no voltage can any longer be present at the input of the second relay 44. Accordingly, the ancillary path 46 is, in turn, closed by the second switch 42 so that the ignition-switch device 28, in turn, assumes the start position shown in FIG. 3 and is available for a renewed switch-on of the brake loop of the electric brake system via the switch-on signal.

The following individual faults are tolerated by the ignition-switch device 28 of FIG. 3 without the supply path 34 being opened:

there is an absence of the switch-on signal (supra); and, an erroneous drive of the input of the second relay 44 occurs via the computer unit 30 via the signal line 36 and, as a consequence thereof, an opening of the ancillary path 46 occurs because of the opening of the second switch 42 (in this case, the input of the first relay 40 is still driven by the switch-on signal via the signal line 46 so that the switch 38 and therefore the supply path 34 remain closed).

Figure 4:
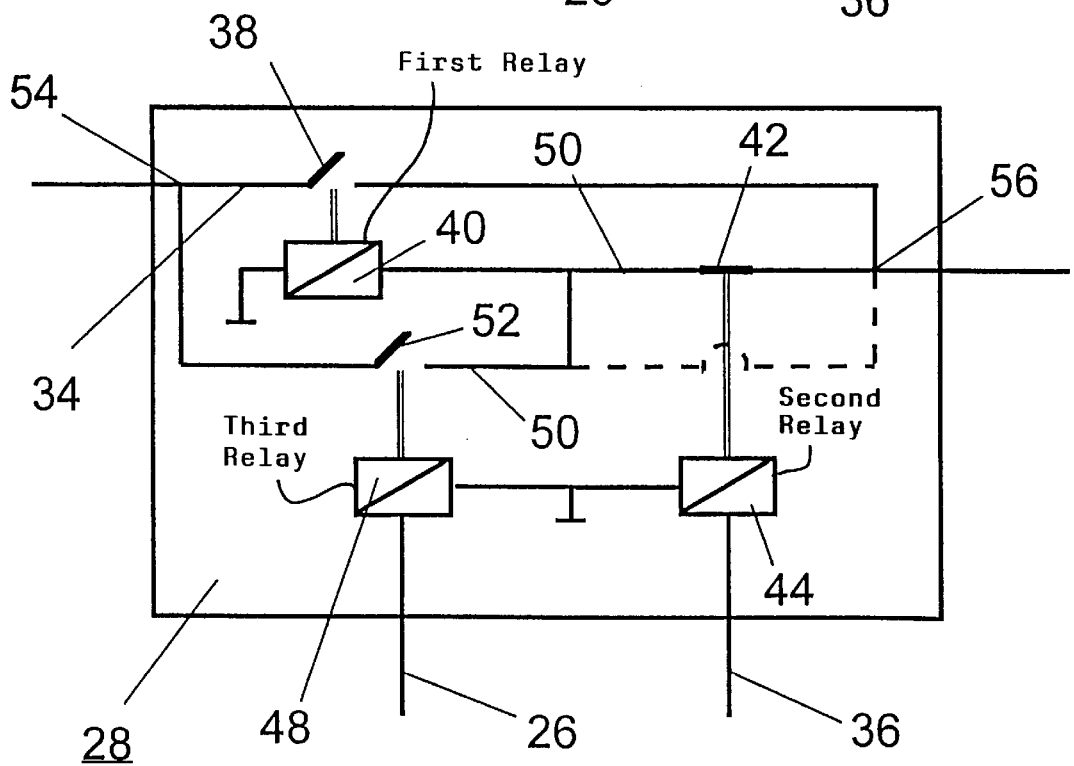

FIG. 4 shows a second embodiment of an ignition-switch device 28. In this embodiment, the ignition-switch device includes, in addition to the first supply path 34, a second supply path 50, which, for example, can be arranged between a first point 54 and a second point 56.

In the following, the operation of the ignition-switch device 28 of FIG. 4 is explained.

When a switch-on signal is applied to the signal line 26, a third switch 52 is closed via a third relay 48 and, as a consequence thereof, the first switch 38 is closed by driving the first relay 40. In this way, the energy consumers are connected to the voltage source via the supply path 34 as well as via the supply path 50.

If, in the embodiment of FIG. 4, a drop or an absence of the switch-on signal occurs at the signal line 26, then the third relay 48 is no longer driven and, as a consequence thereof, the third switch 52 opens and therefore also the supply path 50. However, the energy consumers remain connected via supply path 34 to the voltage source because the switch 38 remains closed even when the switch-on signal on line 26 is absent. An opening of the supply path 34 with the input signal absent is only possible when the switch 42 is opened and the input of the first relay 40 is no longer supplied with voltage. The opening of the switch 42 is effected by the computer unit 30 in that a corresponding signal is given to the input of the second relay 44 via the signal line 36 as already explained above in connection with FIG. 3.

If the effectuation of the opening of the supply path 34 via the computer unit 30 is completed, that is, no signal is applied to the signal line 36 and no voltage is therefore present at the input of the second relay 44, then the second switch 42, in turn, closes and the ignition-switching device 28, in turn, assumes the start position shown in FIG. 4 and is available for a new switch-on of the brake loop of the electric brake system via the switch-on signal.

The following individual faults are tolerated by the ignition-switching device shown in FIG. 4:

(a) an absence of the switch-on signal occurs (supra);

(b) an erroneous drive of the input of the second relay 44 by the control unit 30 occurs via the signal line 36 and, as a consequence thereof, the second switch 42 opens. (In this case, the first switch 38 remains closed and therefore the supply path 34 remains closed because of the applied switch-on signal at the signal line 26);

(c) the first relay 90 fails at any point in time (in this case, the first switch 38 and therefore the supply path 34 are no longer closed, a connection of the energy consumer to the voltage source is however still possible as previously via the supply path 50); and, (d) the third relay 48 fails during travel (in this case, the switch 52 opens and therefore also the supply path 50; however, the energy consumers remain connected via the supply path 34 to the voltage source because the switch 38 continues to remain closed).

According to a variation of the embodiment of the ignition-switch device 28 shown in FIG. 4, it is possible to direct the second supply path 50 first around the second relay 44 or around the second switch 42 to the second point 56 as shown in FIG. 4 by the broken line. In this case, the ignition-switch device 28 tolerates, in addition to the above-mentioned individual faults, the following fault:

the first relay 40 becomes defective at any point in time and, simultaneously, an erroneous drive of the input of the second relay 44 occurs by the control unit 30 via the signal line 36 which leads to an opening of switch 42 (in this case, the first supply path 34 is opened but, nonetheless, the energy consumers remain connected to the voltage source via the second supply path 50).

A further advantage of this variation is that the second switch 42 is no longer in the supply path 50 via which the energy consumers are connected to the voltage source. For this reason, the second relay 44 can be configured so as to be small and cost effective.

It is understood that the foregoing description is that of the preferred embodiments of the invention and that various changes and modifications may be made thereto without departing from the spirit and scope of the invention as defined in the appended claim.

What is claimed is:

1. An electric brake system for a motor vehicle wherein a switch-on signal is initiated, the electric brake system comprising:

at least one energy consumer;

at least one computer unit;

at least one voltage source;

an ignition-switch device for connecting said voltage source to said energy consumer when said switch-on signal is applied to said device;

said computer unit being connected to said ignition-switch device; and, said ignition-switch device including circuit means for maintaining a connection between said energy consumer and said voltage source notwithstanding a drop in or a switch-off of said switch-on signal until said computer operates on said circuit means to cause said energy consumer to be disconnected from said voltage source.

2. The electric brake system of claim 1, further comprising:

means for supplying signals to said computer unit indicative of specific parameters of said motor vehicle; and, said computer unit being so configured that said computer unit operates on said circuit means to disconnect said energy consumer from said voltage source only when said specific parameters satisfy predetermined conditions.

3. The electric brake system of claim 2, said specific parameters including: wheel rpm, crankshaft rpm and said switch-on signal.

4. The electric brake system of claim 1, further comprising:

a first supply path for connecting said voltage source to said energy consumer;

said circuit means including a first switch in said first supply path for closing said first supply path when said switch-on signal is applied to said circuit means; and, said circuit means including ancillary circuit means for holding said first switch closed after a drop of or a switch-off of said switch-on signal until said computer unit operates on said ancillary circuit means to open said first switch and said first supply path.

5. The electric brake system of claim 4, further comprising:

a second supply path for connecting said voltage source to said energy consumer;

said circuit means including a second switch in said second supply path for closing said second supply path when said switch-on signal is applied to said circuit means; and, said ancillary circuit means being configured to hold one of said first and second switches closed after a drop of or a switch-off of said switch-on signal until said computer unit operates on said ancillary circuit means to open said one switch.

6. A method of operating an electric brake system for a motor vehicle wherein a switch-on signal is initiated, the electric brake system including: at least one energy consumer; at least one computer unit; at least one voltage source; an ignition-switch device for connecting the voltage source to the energy consumer when said switch-on signal is applied to the devices the method comprising the step of:

keeping said energy consumer connected to said voltage source until said computer unit triggers the disconnection of said energy consumer from said voltage source.

7. The method of claim 6, comprising the further step of causing said control unit to trigger said disconnection only when specific parameters of said motor vehicle satisfy predetermined conditions.

8. The method of claim 1, wherein said specific parameters include: wheel rpm, crankshaft rpm and said switch-on signal.

9. The method of claim 7, wherein a check as to whether said parameters satisfy said predetermined conditions is carried out by said computer unit.

10. The method of claim 9, wherein: after said switch-on signal is switched off and before said energy consumer is disconnected from said voltage source by said computer unit, said computer unit triggers other operations.

11. The method of claim 10, said other operations including engaging an electric parking brake or activating a drive-inhibit device.

* * * * *

UNITED STATES PATENT AND TRADEMARK OFFICE
CERTIFICATE OF CORRECTION

PATENT NO. : 5,962,931
DATED : October 5, 1999
INVENTOR(S) : Christof Maron and Thomas Dieckmann It is certified that error appears in the above-identified patent and that said Letters Patent is hereby corrected as shown below:

In column 6, line 37:   Delete "90" and substitute -- 40 -- therefor.

In column 8, line 23:   delete "devices" and substitute -- device, -- therefor.

In column 8, line 31:   delete "1," and substitute -- 7, -- therefor.

Signed and Sealed this

First Day of May, 2001

Attest:

NICHOLAS P. GODICI

*Attesting Officer*    *Acting Director of the United States Patent and Trademark Office*